Dec. 10, 1957 D. B. PECK 2,816,273
ARTIFICIAL TRANSMISSION LINE
Filed Aug. 1, 1952 2 Sheets-Sheet 1

INVENTOR.
DAVID B. PECK
BY
Arthur J. Connolly
HIS ATTORNEY

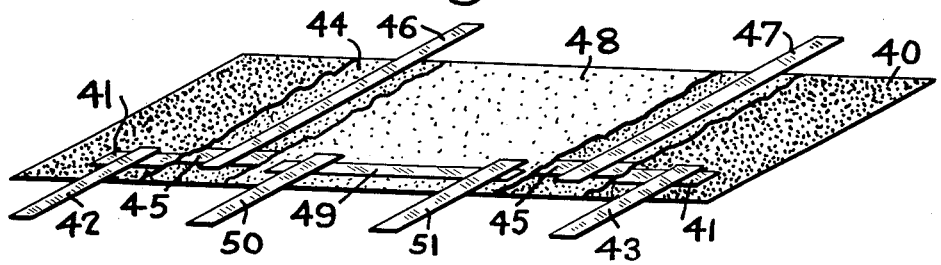
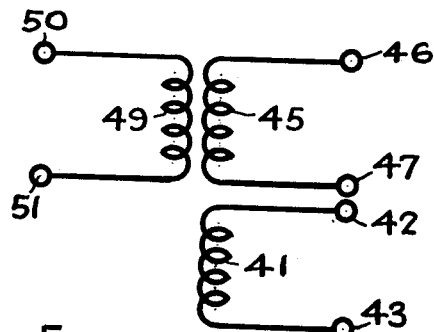
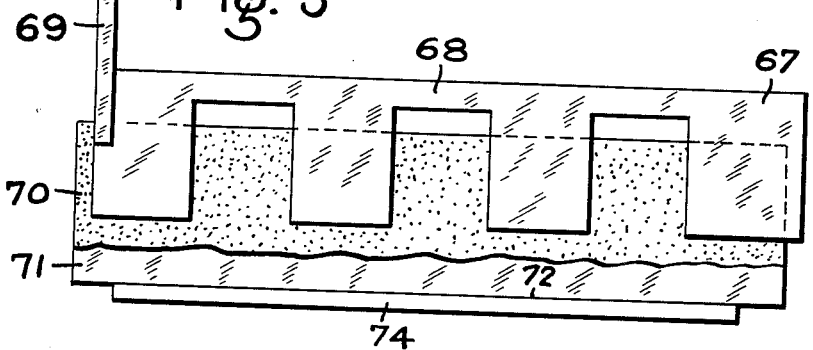
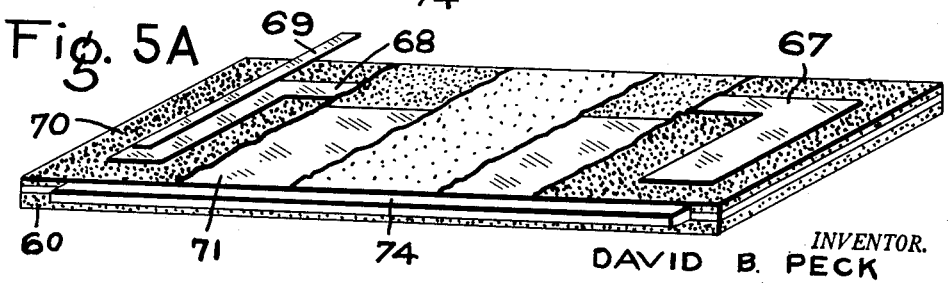

United States Patent Office 2,816,273
Patented Dec. 10, 1957

2,816,273

ARTIFICIAL TRANSMISSION LINE

David B. Peck, Williamstown, Mass., assignor to Sprague Electric Company, North Adams, Mass., a corporation of Massachusetts Application August 1, 1952, Serial No. 302,070

3 Claims. (Cl. 333—23)

This invention relates to improved electrical components and more particularly refers to subminiature artificial transmission lines possessing high capacity which are particularly useful in low voltage service.

In U. S. Patents 2,526,321, 2,552,306 and 2,565,093 are disclosed new types of artificial transmission lines useful in high frequency filtering, pulse formation and signal delay, as well as other functions based upon the principles of transmission lines.

Certain types of these transmission lines may be constructed with one or more of electrodes comprising a metallized layer upon a dielectric spacer.

Successful preparation of the deposited electrode-dielectric spacer assembly depends upon the provision of a more or less smooth surface for condensation of the metal. Where paper is used as the primary dielectric it is customary to provide one surface of the paper with a lacquer film upon which the metal, usually zinc or aluminum, is deposited.

Unfortunately, however, these lines, despite their distinct advantages over foil type capacitors, suffer from several disadvantages. A most important problem resides in the preparation of networks for service at very low voltages, perhaps on the order of 5 to 25 volts. Here the thinnest paper or, indeed, resin film which can be used and which possesses any degree of mechanical strength is far thicker than is necessary from electrical considerations. For example, a dielectric spacer approximately ¼ of a mil in thickness is about the thinnest material which can be handled, yet is perhaps ten times as thick as is necessary from a dielectric strength viewpoint. As a result the volume of a network or line of such a construction for any given electrical capacity is many times the theoretical volume necessary for low voltage service.

The advent of such electronic devices as transistors has emphasized the need for high capacity low voltage elements as well as miniaturized versions of other components including resistors and transformers.

It is an object of the present invention to overcome the foregoing and relating disadvantages. A further object is to produce new and useful artificial transmission lines and related electrical units for very low voltages. A still further object is to produce artificial transmission lines of minimum dielectric thickness which are not subject to the mechanical and physical problems usually associated with dielectric films of a thickness of 0.1 mil and less. A still further object is to produce new and useful circuit components such as resistors and inductors. Additional objects will become apparent from the following description and claims.

These objects are attained in accordance with the present invention wherein there is produced an electrical component comprising a convolutely wound, thin, flexible base upon which is sequentially disposed an electrode layer of thickness less than about 0.15 micron, said electrode extending to but one side of the winding, a film of dielectric material of thickness less than about 2.5 microns covering substantially entirely all of the active electrode area, a second metal electrode of thickness less than about 0.15 micron extending to the opposite edge of said winding with respect to the other of said electrode foils, another thin dielectric film and additional alternate electrode layers and dielectric films, the exposed edges of said electrode layers being provided with integrally bonded metal terminal layers.

In one of its limited embodiments the invention is concerned with an artificial transmission line comprising a convolutely wound flexible insulating base upon which is deposited a zinc electrode layer of thickness of about 0.06 micron from one edge of the winding to a marginal point on the other edge of the winding, a layer of a dielectric material of thickness of about 2 microns deposited upon said electrode layer, a second electrode layer of about 0.06 micron thickness deposited from the opposite edge of the winding from said first electrode layer to a marginal point in the winding next to said first edge, another dielectric film layer of thickness about 2 microns disposed over said electrode layer and a plurality of additional alternate electrode layers and dielectric films, sprayed metal layers being integrally bonded to the exposed edges of said winding to provide terminal contact with each turn of each electrode layer.

Another of the limited embodiments of the invention is concerned with a multi-layer metallized conductor construction which can be employed as a subminiature inductor or alternately as a high value resistor.

It has been found that very small electrical components can be made by utilizing a special combination of thin electrode layers of controlled resistivity and extremely thin dielectric layers. The invention is limited to metal films whose thickness is less than about 0.15 micron and to dielectric films whose thickness is less than about 2.5 microns. By utilizing a combination of a plurality of such elements, usually on a somewhat thicker initial base, the latter normally possessing a thickness of about .3 to .5 mil, it is possible to produce extremely high capacitances, inductances and resistances in electrical assemblies exhibiting primarily these characteristics and, further, no impregnant or subsequent treatment of the assemblies is required to attain optimum electrical performance.

The invention will be further described with reference to the appended drawings in which:

Figs. 4 and 4A show a further modified form of the invention; and

Figs. 5 and 5A show a still further modified form of the invention.

Figure 1:
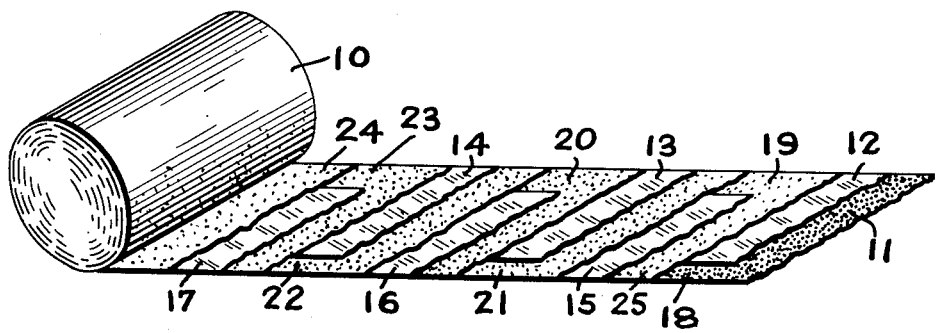
Fig. 1 shows a schematic view of a partially unwound assembly according to the invention.
Figure 2:
Fig. 2 shows a cross-sectional view of the assembly of Fig. 1.

Referring more specifically to Figures 1 and 2, 10 represents the roll of an artificial transmission line assembly without the sprayed end terminals which serve to provide contact with each turn of the electrode assembly. 11 represents the base dielectric layer which is used for the support of the active electrode and dielectric areas. 12, 13 and 14 represent electrode layers of a common polarity while 15, 16 and 17 represent electrode layers of opposite polarity, extending to opposite edges of the base layer 11. 18 represents the marginal area for electrodes 12, 13 and 14, whereas 19 represents the marginal electrode areas for electrodes 15, 16 and 17. Separating the electrode layers are thin dielectric layers 20, 21, 22, 23, 24 and 25. These normally overlap the entire electrode area but may be reduced in thickness at the marginal areas to permit thicker layers of terminating electrodes in this section.

Figure 3:
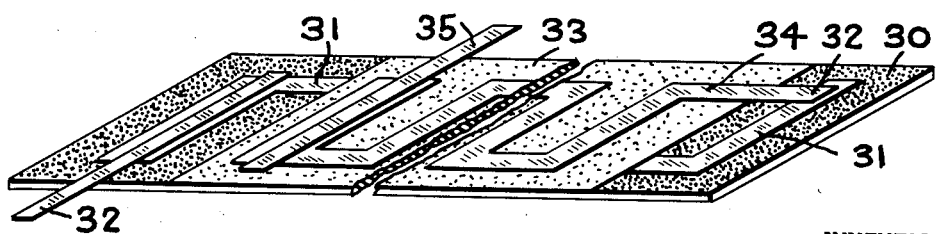
Fig. 3 shows a partially cut-away view of a modified assembly construction connected as a high megohm resistor.

Figure 3 shows a partially cut away and unrolled resistance element in which resistance layers are connected alternately at different ends of the element. Layer 31, for example, is connected to the next layer 34 at 32, while terminal leads are shown at 35 and 36. Separation between electrode layers is effected by means of dielectric separator 33 which again is a very thin resin film. Multiple layers can be built up this way to provide added resistance value. The current carrying value of the resistor is dependent upon the thickness and pattern of the resistance layer. For high currents a block pattern electrode would be employed. Capacity between layers can be minimized by a non-overlapping zig-zag pattern as shown. Inductance can be minimized by the counter-direction current flow principle, providing an even number of electrode layers are employed. Optionally, several layers can be deposited on each dielectric film spacer as an elongated zig-zag pattern.

Figure 4 shows the laid-out construction of a transformer in which the base for the assembly is dielectric layer 40. Inductance elements consist of element 41 with terminal tabs 42 and 43, this inductor being deposited upon base 40, inductor element 45 with terminal elements 46 and 47 being laid upon thin dielectric film 44; and finally inductor pattern 49 with terminal elements 50 and 51 being deposited upon thin dielectric spacer 48. In the convolutely wound form there will, therefore, be a series of spiral inductance elements. The amount of distributed capacity between inductors can be controlled over a wide range by controlling the amount of overlap as well as the width and length of the inductors. The thickness of the dielectric spacer is also important in this regard. The Q of the transformer will depend upon the resistance of the electrode layers, the presence and nature of any magnetic materials in the winding, etc. Figure 4A shows a schematic representation of the transformer of Fig. 4.

Figs. 5 and 5A show a simplified top view and a partially cut-away view, respectively, of the active electrode assemblies for a delay line such as is used in delaying transmission of a pulse in a radar system. For such applications and particularly those involving extended delay periods, it is often desirable to have a relatively high ratio of capacity to inductance, appropriately lumped and distributed.

Common electrode 71 is provided with a terminal contact 74 throughout its length at 72. The combined inductance-capacitance electrode 67 overlaps electrode 71 only in the portion wherein capacitance is desired. For example, the inductance portion of this electrode as shown at 68 does not overlap electrode 71 and, accordingly, the amount of capacitance to electrode 71 is very low. Terminal 69 is provided at one extremity of electrode 67. The thin dielectric film 70 separates the two electrode systems and provides high capacity per unit area therebetween. Base film 60 is used as previously described in connection with Figure 1.

The electrode layers are ordinarily deposited by condensation of the metal vapor under vacuum onto a relatively cool surface of the dielectric film. However, other methods, such as chemical reduction of silver compounds, may be employed if so desired. The metals which may be used in accordance with the invention includes zinc, aluminum, lead, tin, silver, gold, as well as other metals and alloys thereof. Zinc is particularly useful because of its low boiling point and moderate resistance to oxidation. The exact conditions for the electrode deposition depend upon the nature of the dielectric material upon which the deposit is made, the speed of travel and other related conditions. Marginal areas may be provided by treatment of the dielectric layer with an oil film, by masking with mechanical shields during the deposition phase and/or by subsequent sparking away of the undesired metal.

The base used for the multi-electrode dielectric assembly is normally from about 6 to about 15 microns in thickness and may consist of cellulose acetate and other cellulose esters and ethers, polystyrene, Teflon, regenerated cellulose, polyacrylonitrile, polyterephthalic glycolate and the like. The active dielectric layers are selected on the basis of the final electrical characteristics and low power factor. Polystyrene is a satisfactory material for general applications. Cellulose acetate and other cellulose esters and ethers may be employed; and where optimum high capacity is desired highly polar polymers such as polyvinyl alcohol, polymers of esters of the acrylic acid, polymers of the protein structures, caprolactam, etc. may be employed.

In many cases once a plurality of dielectric and electrode layers are built up upon the base, it is possible to employ a stripping process to remove the base from the multiple layer device and accordingly secure even greater volume efficiency.

The method of forming the dielectric layers usually consists of passing the base through a solution of the polymer in an appropriate solvent followed by removal of the solvent and final polymerization curing of the resins. It is to be understood that particularly in those cases in which solvent application of the dielectric is employed, that alternate layers of dielectric must be incompatible to the extent that the first layer must not dissolve in the second of succeeding layer due to action of the solvent carrying the second layer, or for that matter, of the second layer resin itself. This may be accomplished by alternating the layers of resinous materials which are soluble in different classes of solvents, for example, for one layer cellulose acetate dissolved in acetone could be used while for the next layer a chlorinated rubber could be used. In addition and in accordance with one of the preferred embodiments of the invention, the dielectric layer is cross-linked and converted into a substantially insoluble state following its deposition. In the case of cellulose ethers and esters this can be accomplished by treatment with an organic diisocyanate. Alternately the base can be dipped in a monomer which is subsequently converted to a thin film of polymer by heating and/or catalysis. Another method is to evaporate the polymer and condense it upon the surface of the base; and the polymer, formed by vapor phase free radical combination, as in the case of para-xylene, may be condensed on the desired base.

The invention is also of interest in the formation of electrolytic systems characterized by unusually high electrical capacity and/or voltage or current output. For example, one or more of the electrodes may consist of a thin film of aluminum oxidized to an extent sufficient to provide an insulating film which will withstand perhaps 25V; such an anode can be used with a spacer which is a semi-conductor or which would behave as a polymeric electrolyte as disclosed by Ross in U. S. patent application Ser. No. 276,670, filed on March 14, 1952, now abandoned. Alternately and, for example, where one electrode is zinc and another electrode copper, an electrochemical couple can be achieved by using a semi-conducting and/or ionically conducting polymer. A suitable construction by alternating a large plurality of such layers (terminating only the first and last layers), can result in the production of very high voltage sources for low current drain applications. Where low voltage and high current outputs are desired, alternate layers of two different metals or metal oxide elements are each terminated in parallel to opposite edges of the winding to secure exceptionally large electrode overlapping areas with very short electrolyte paths. Consequently extremely high current output can be achieved for limited service periods.

In the field of artificial transmission lines such as disclosed in United States Patent 2,552,308, units characterized by extremely high capacity per unit volume and by wide frequency utility can be made in accordance with my invention. In such an instance one electrode foil, the narrower of the two, would be terminated only at the outermost or innermost section of the winding. Here each of the narrower electrode deposits would be connected together while the edges of the wider electrode layers would be terminated at both sides of the winding and connected to the casing or to a feed through conductor, depending upon the structure.

As many apparently widely different embodiments of this invention may be made without departing from the spirit and scope hereof, it is to be understood that the invention is not limited to the specific embodiments hereof except as defined in the appended claims.

What is claimed is:

1. An artificial transmission line comprising a convolutely wound flexible self-supporting insulating base upon which is deposited a zinc electrode layer of thickness of about 0.06 micron extending from one edge of the winding to a point short of the opposite edge of the winding, a film of a dielectric resin having a thickness of about 2.0 microns deposited upon said electrode layer and extending from one side edge to the other, a second electrode layer of about 0.06 micron thickness deposited from said opposite edge of the winding to a point short of said first edge, another dielectric resin film of thickness about 2.0 microns of a resin immiscible with the resin of the first mentioned film disposed over said last-mentioned electrode layer, and extending from one side edge to the other, additional alternate electrode layers and alternating immiscible dielectric resin films, and sprayed metal layers bonded to the exposed edges of said winding to provide terminal contact with each turn of each electrode layer.

2. The artificial transmission line of claim 1 in which said second electrode layer has portions in inductive and capacitive relationship with said zinc electrode layer and wherein only the capacitive portions overlie said zinc electrode layer.

3. An artificial transmission line having an elongated thin flexible self-supporting dielectric base on which is deposited alternating layers of metal less than 0.15 micron thick, and resin dielectric less than 2.5 microns thick, none of the metal layers extending to both side edges of the base, one metal layer extending to only one side edge of the base, a different metal layer extending to only the opposite side edge of the base, the resin layers extending to both side edges of the base, contacting the adjacent metal layers and insulating them from each other, successive layers of resin being immiscible with each other, the assembly being convolutely wound and each side edge of the wound assembly having a terminal connection.

References Cited in the file of this patent

UNITED STATES PATENTS

| | | |
|---|---|---|
| 1,784,611 | Polanyi et al. | Dec. 9, 1930 |
| 2,375,097 | Gage | May 1, 1945 |
| 2,504,178 | Burnham et al. | Apr. 18, 1950 |
| 2,537,959 | Beverly | Jan. 16, 1951 |
| 2,593,829 | Arledter et al. | Apr. 22, 1952 |
| 2,614,524 | Haynes | Oct. 21, 1952 |
| 2,634,314 | Netherwood | Apr. 7, 1953 |
| 2,721,310 | Schenker et al. | Oct. 18, 1955 |
| 2,721,311 | Netherwood et al. | Oct. 18, 1955 |

FOREIGN PATENTS

| | | |
|---|---|---|
| 340,144 | Great Britain | Dec. 24, 1930 |